June 27, 1933.  W. GEUROLOFF  1,915,730

MECHANICALLY OPERATED SCOOP

Filed Feb. 2, 1933   3 Sheets-Sheet 1

Inventor
Wasil Geuroloff

By Lawrence A. O'Brien
Attorney

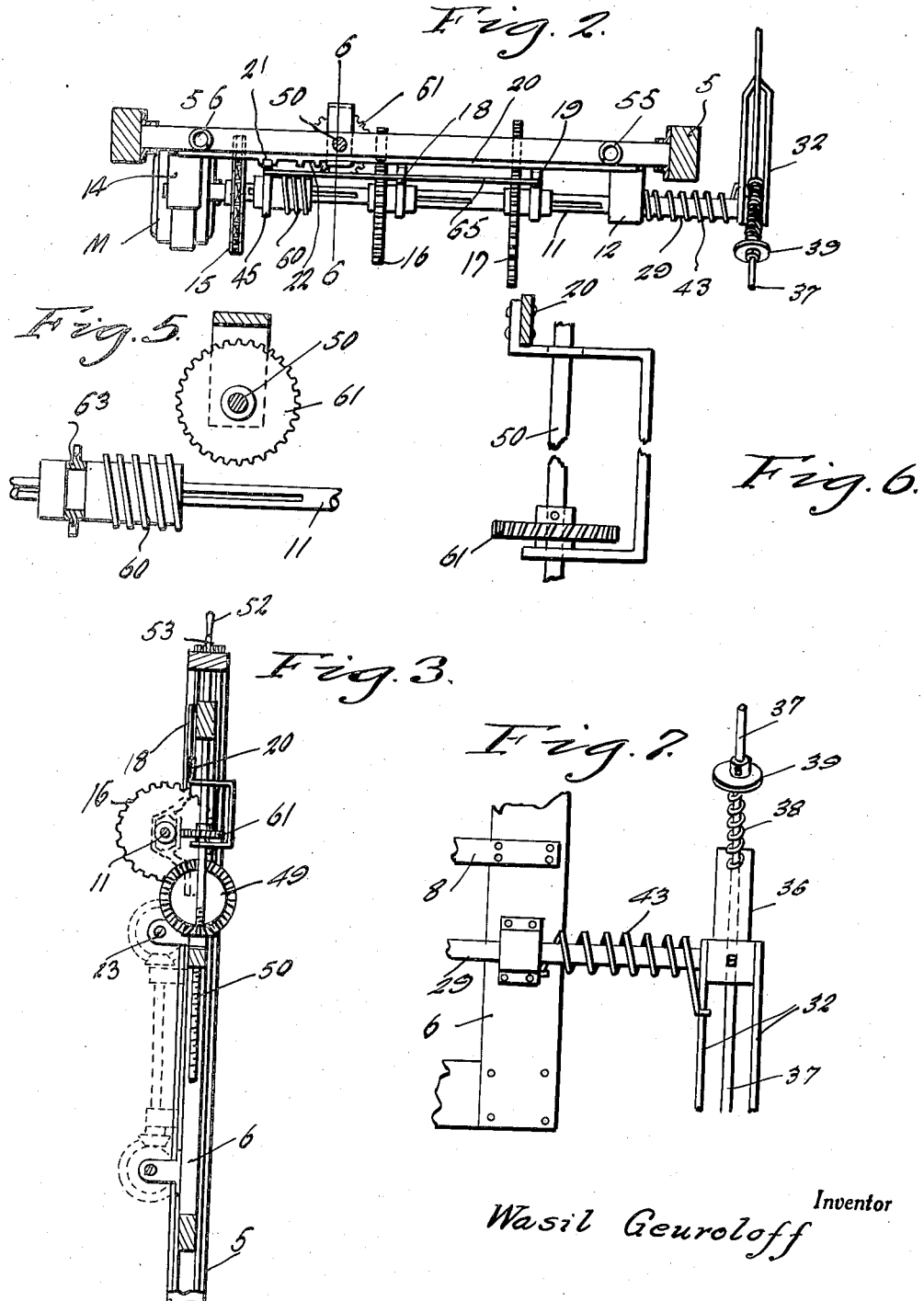

June 27, 1933.  W. GEUROLOFF  1,915,730
MECHANICALLY OPERATED SCOOP
Filed Feb. 2, 1933  3 Sheets-Sheet 3
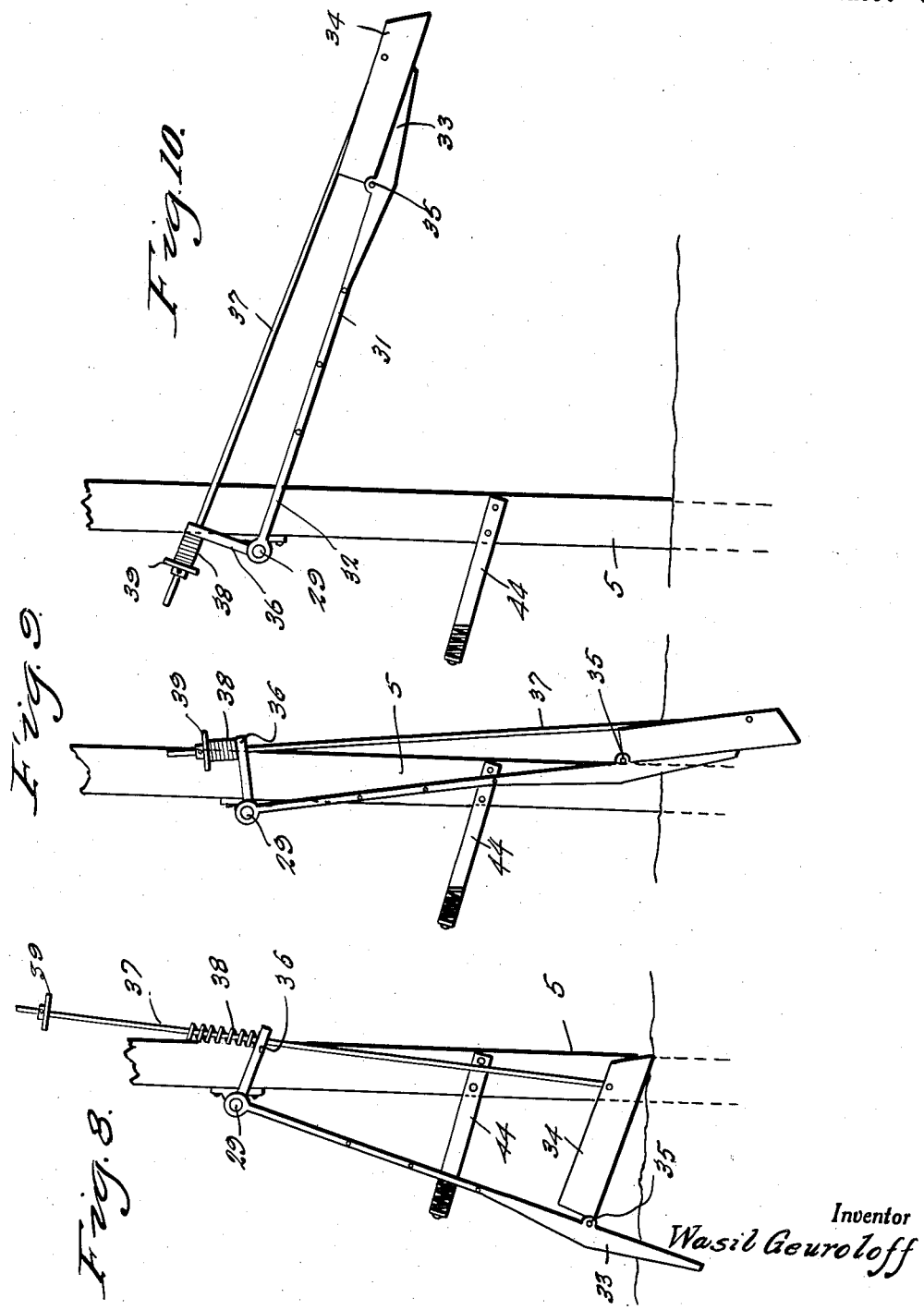
Inventor
Wasil Geuroloff
By Clarence A. O'Brien
Attorney Patented June 27, 1933

1,915,730

UNITED STATES PATENT OFFICE

WASIL GEUROLOFF, OF WATSON, SASKATCHEWAN, CANADA

MECHANICALLY OPERATED SCOOP

Application filed February 2, 1933. Serial No. 654,944.

The present invention relates to a mechanically operated scoop or shovel and an important object thereof is to provide a pivotally mounted scoop with a mechanism to operate the same in an arcuate path to move grain or the like from one position to another.

A further object of the invention is to provide a means whereby the scoop and its operating mechanism may be raised or lowered by a motor.

A still further object of the invention resides in the provision of a mechanically operated scoop of this nature which is comparatively simple in its construction, efficient and reliable in its operation, and otherwise well adapted to the purpose for which it is designed.

With the above and numerous other objects in view as will appear as the description proceeds the invention resides in certain novel features of construction, and in the combination and arrangement of parts as will be hereinafter more fully described and claimed.

In the drawings:—

Fig. 2 is a horizontal section taken substantially on the line 2—2 of Fig. 1.

Fig. 3 is a vertical section taken substantially on the line 3—3 of Fig. 1.

Fig. 5 is a section on line 5—5 of Fig. 1.

Fig. 6 is a section on line 6—6 of Fig. 1.

Fig. 7 is an enlarged detail view of the scoop supporting means.

Figure 1:
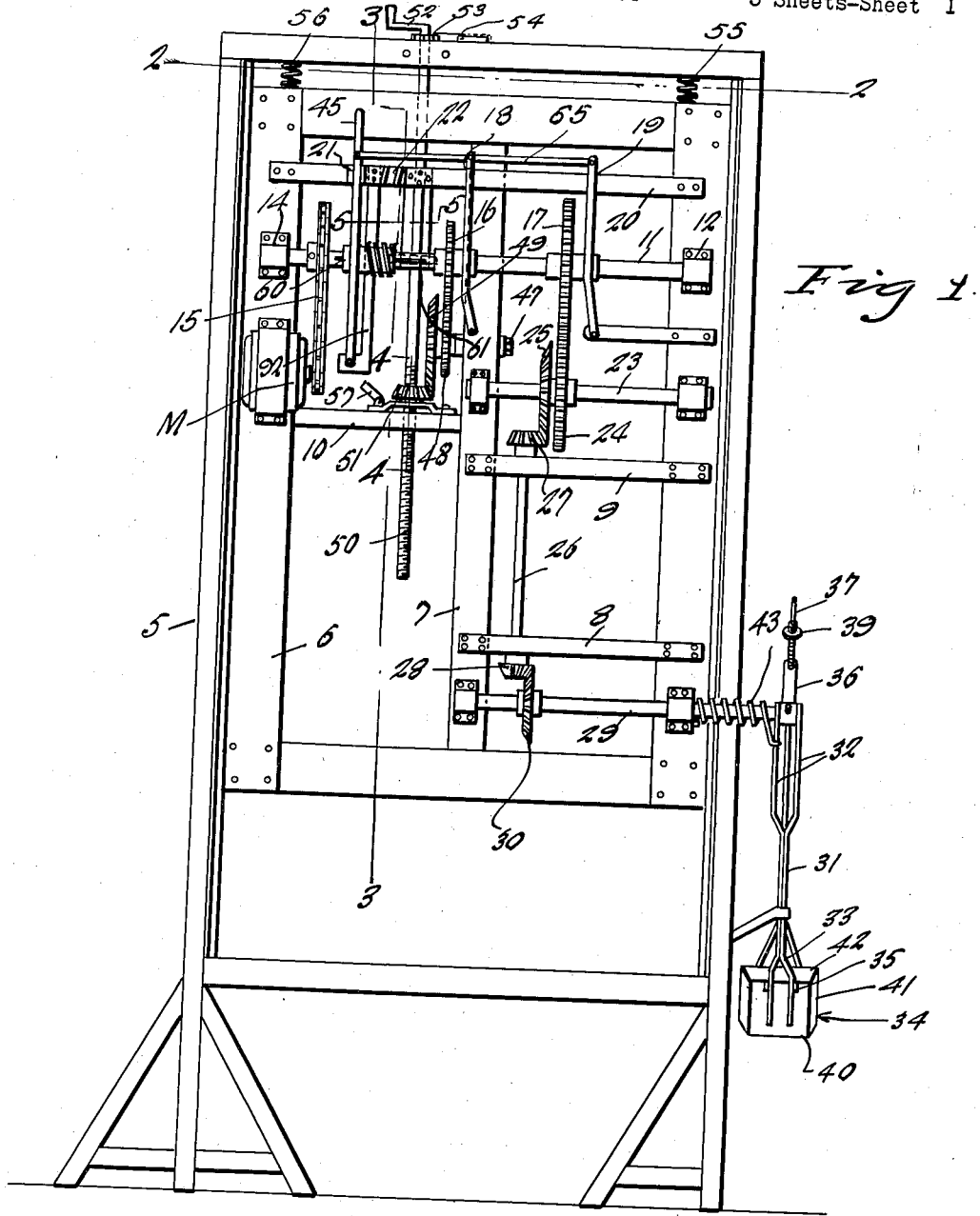
Figure 1 is a rear elevation of the preferred embodiment of my invention.
Figure 4:
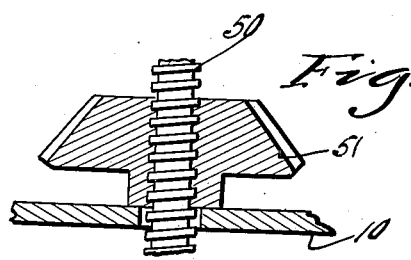
Fig. 4 is a section on line 4—4 of Fig. 1.

Figs. 8, 9, and 10 illustrate the successive step positions of the scoop from its rearmost position, in its pickup position and its discharge position, respectively.

Referring to the drawings in detail, it will be seen that the numeral 5 denotes the supporting frame structure in which the movable frame 6 is retained and adapted to move vertically therein. This movable frame 6 is preferably rectangular in shape and is provided with a centrally disposed upright 7.

Cross braces 9, 10 and 8 are disposed between the central upright 7 and the side members of the frame 6. A suitable shaft 11 is mounted in bearings 12 and 14 carried on the frame 6. This shaft is driven from a motor M supported on frame 6, by the sprockets and chain 15. Drive gears 16 and 17 are reciprocally mounted on the shaft in keyed relation thereto. A lever 18 is mounted in fulcrumed relation to the drive gear 16 and is adapted to move the same longitudinally on the shaft 11. A lever 19 is mounted in fulcrumed relation to the drive gear 17 and is adapted to move the same longitudinally on the shaft 7. A lever rack 20 extends across the top part of the frame 6 and this rack 20 is provided with spaced ears 21 and 22.

A shaft 23 is rotatably mounted on the frame 6 in parallel relationship and below the shaft 11. A gear 24 is fixedly mounted on the shaft 23 and in mesh relationship to the drive gear 17, when the latter is in operative position. A bevel gear 25 is fixedly mounted on the shaft 23. A vertical shaft 26 is supported by the cross braces 8 and 9 and has a bevel pinion 27 fixedly attached at its upper end in mesh with the bevel gear 25 and has a bevel pinion 28 fixedly attached at its lower end. A shaft 29 is rotatably mounted on the frame 6 preferably in parallel relationship below the shafts 11 and 23. This shaft 29 is provided with a bevel gear 30 in fixed relationship thereto and in mesh with the pinion gear 28. Pinion gear 28 is provided with only a predetermined number of teeth sufficient to give the desired length of strokes to the scoop hereinafter mentioned.

A scoop arm 31 has its opposite ends forked as at 32 and 33 respectively. The upper ends are preferably provided with annular enlargements which are fixedly attached on the protruding end of the shaft 29. A scoop 34 is hingedly connected at its heel to the end 33 as at 35, the outer portions of the ends 33 being designed to normally contact under the scoop 34 and act as a carrying support for the same when the latter is being moved to discharge position. A bracket 36 has one end of enlarged annular formation and is adapted to be fixedly mounted on the shaft 29 intermediate the prongs of the end 32. The outer free end of this bracket 36 is provided with an opening through which the rod 37 extends. A coil spring 38 is on the rod 37 above the bracket 36. The lower end of the rod 37 is forked, the offset prongs being hooked into the respective side walls of the scoop 34. Mounted on the upper end of the rod 37 is a flanged washer 39 which may be retained in various positions adjacent to the end by means of a set screw. The scoop 34 consists of a bottom, side walls and a back 40, 41 and 42 respectively, the front end being opened.

A coil spring 43 is disposed around the shaft 29, and one end is lapped over one of the prongs of the end 32 and the other end is engaged in the frame 6. This coil spring is designed to turn the shaft 29 and automatically return the scoop to its rearmost position as shown in Fig. 8. A bracket 44 on the side of the frame 5 has a spring tension contact face against which the scoop arm 31 will strike when returning to its rearmost position.

The bevel gear 28 hereinbefore stated, is toothed for a predetermined distance around its periphery, the remaining portions being left blank. When the shaft 26 is rotated, through the medium of the gears hereinbefore mentioned by the motor M and its connecting drive 15, the pinion gear 28 will rotate the bevel gear 30 a predetermined distance sufficient to carry the scoop arm 31 from the rearmost position shown in Fig. 8 to the discharge position shown in Fig. 10. When the scoop 34 has been carried to its discharge position in Fig. 10, the teeth of the pinion gear 28 will have completed their engagement with the teeth of the beveled gear 30 and during the completion of the rotation of the pinion 28, the scoop will return to its rearmost position as in Fig. 8 by means of the spring 43.

During the return of the scoop from its discharge position to its rearmost position, the end of the scoop will trail over the surface of the grain as shown in Fig. 8 and the prongs of the end 33 will cause little resistance of cutting through the grain.

As soon as the arm 31 commences to move toward the discharge position, the heel of the scoop 34 will be carried forward while the nose is forced down into the grain as shown in Fig. 9. The coil spring 38 is of sufficient length that the flanged washer 39 will contact with the upper end thereof before the end 33 of the scoop arm 31 is in contact carrying position relative to the scoop 34, so that the scoop 34 will have a slight forward movement commenced through the medium of rod 37 and not having a direct snap pick up when the end 33 contacts with the bottom of the scoop 34.

Mounted on the upright 7 is a stub shaft 47 on which is rotatably mounted a gear 48, which gear is in mesh with the drive gear 16 when the latter is in operative position. A beveled gear 49 is connected to the gear 48. A shaft 50 has its lower end portion spirally threaded through a pinion 51 which pinion 51 is in mesh with the bevel gear 49. The upper end of the shaft 50 is suitably supported in the upper end of the frame 5 and provided with a crank handle 52. An annular member 53 is fixedly carried on the shaft 50 and adjacent the handle 52, and has its outer periphery slotted to receive the end of the pivotally mounted dog 54, which when in engaged position relative to the member 53, will retain the shaft 50 against rotary movement.

If desired, return springs 55 and 56 may be provided with their upper ends attached to the upper end of the frame 5 and their lower ends attached to the upper end of the frame 6. These springs will facilitate raising of the frame 6. This frame 6 is gradually lowered during the rotation of the gears 16, 48, 49 and 51, the latter having spirally threaded engagement with the shaft 50. When the frame 6 is to be raised by hand, the dog 57 is turned over so that its free end engages between the teeth of the pinion 51 and retains the same against rotary action while the spirally threaded end of the shaft 50 is being turned therein, so that the frame is raised.

I also provide means for raising the frame 6 by the motor M. This means includes a worm 60 which is keyed to the shaft 11 and a worm gear 61 on the shaft 50 so that when the worm 60 is moved into engagement with the gear 61 the shaft 50 is turned by the motor, and this shaft 50 engages the pinion 51, which is held against movement by the dog 57, the pinion 51 riding up the shaft and thus carry the frame 6 with it, so that the frame is raised by the motor. The worm 60 is moved into and out of mesh with the gear 61 by means of a lever 45 hinged at its lower end to the hanger 62 attached to the bar 20 and said lever 45 is provided with a collar 63 engaging a groove in the worm. This lever 45 is held in operative or inoperative position by the pairs of ears 21 and 22 and a link 65 connects said lever with the levers 18 and 19.

Thus by moving the lever 45 into engagement with the ears 22, the worm 60 is placed in mesh with the worm gear 61 while the levers 18 and 19 move the gears 16 and 17 out of mesh with the gears 48 and 24. Thus the gear 50 is turned to raise the frame 6 and of course while this is being done the dog 64 must be moved to inoperative position. As will be seen from Fig. 5, the worm 60 must be moved a considerable extent before it engages the gear 61. This permits the lever 45 to be placed between the pairs of ears 21 and 22 to move the levers 18 and 19 a sufficient degree to move the gears 16 and 17 out of mesh with the gears 48 and 24 and without the worm 60 being moved into mesh with worm 61. This will permit the shaft 50 to be turned by hand, so as to raise the frame.

Thus it will be seen that the device acts as a shovel to move grain or the like from a position adjacent the frame 5 to a point to one side of said frame, where the grain is placed in a pile by the shovel or scoop, the grain sliding off the shovel or scoop, due to the inclination of the shovel as shown in Fig. 10.

It is thought that the construction, operation, utility and advantages of this invention will now be quite apparent to those skilled in the art without a more detailed description thereof.

The present embodiment of the invention has been described in considerable detail merely for the purpose of exemplification since in actual practice it attains the features of advantage enumerated as desirable in the statement of the invention and the above description.

It will be apparent that changes in the details of construction, and in the combination and arrangement of the parts may be resorted to without departing from the spirit or scope of the invention as hereinafter claimed or sacrificing any of its advantages.

Having thus described my invention, what I claim as new is:—

1. A mechanically operated scoop comprising a supporting frame, a horizontal shaft supported in said frame, a scoop arm having its upper end attached to the said shaft, a scoop, the heel of the scoop being pivotally connected to said arm an appreciable distance above the lower end thereof, whereby that part of the arm below the pivot will push the scoop through the material, means for oscillating the shaft, a predetermined distance, means for causing contra-rotation of said shaft such distance, a forwardly extending short arm on the upper portion of the scoop arm, and a rod pivoted to the front end of the scoop, and passing through a hole in the short arm, and motor operated means for raising and lowering the supporting frame.

2. A mechanically operated scoop comprising a supporting frame, a horizontal shaft supported in said frame, a scoop arm having its upper end attached to the said shaft, a scoop, the heel of the scoop being pivotally connected to said arm an appreciable distance above the end thereof, whereby that part of the arm below the pivot will push the scoop through the material, means for oscillating the shaft, a predetermined distance, means for causing contra-rotation of said shaft such distance, a forwardly extending short arm on the upper edge portion of the scoop arm, a rod pivoted to the front end of the scoop and passing through a hole in the short arm, a stop on the upper end of the rod and a spring on the rod between the short arm and the stop, and power means for raising and lowering the supporting frame.

3. A mechanically operated scoop comprising a frame, a horizontal shaft supported for rocking movement in said frame, a scoop arm having its upper end attached to the shaft, a scoop having its lower or front end open, a pivot connecting the lower part of the rear end of the scoop to the front part of the arm, said pivot being located an appreciable distance above the lower end of the arm, whereby that part of the arm below the pivot will engage the bottom of the scoop to push the scoop through the material as the arm is swung forwardly, the lower end of the scoop engaging the material, as the arm is swung rearwardly, whereby the scoop will be swung away from that part of the arm below the pivot and ride over the material, means for rocking the shaft to swing the arm forwardly to cause the scoop to enter the material and then be engaged by the lower part of the arm which forces it through the material, the shaft being moved to a point where the arm will extend downwardly and forwardly with the scoop in an inclined position to permit the material to gravitate therefrom, means for moving the shaft in an opposite direction to return the arm and the scoop to its vertical position, a supporting frame on which the first frame is mounted for vertical movement, motor operated means for raising and lowering the first-mentioned frame in the supporting means, and manually operated means for controlling the motor operating means.

4. A mechanically operated scoop comprising a supporting frame, a vertically movable frame therein, a shaft journalled in the second frame, motor operated means for driving said shaft, a scoop operated shaft carried by the second frame, gearing for oscillating the scoop shaft from the first-mentioned shaft, manually operated means for moving one of the gears into operative and inoperative position, manually controlled means for lowering the second frame from the motor driven shaft, manually controlled means for raising said frame from the motor driven shaft, means for raising and lowering the frame by hand when desired, and a scoop arm connected with the oscillatory shaft.

In testimony whereof I affix my signature.

WASIL GEUROLOFF.